(12) United States Patent
Beaujot

(10) Patent No.: US 11,427,120 B2
(45) Date of Patent: Aug. 30, 2022

(54) AGRICULTURAL IMPLEMENT AND RAMP ATTACHMENT SYSTEM

(71) Applicant: DOT Technology Corp., Emerald Park (CA)

(72) Inventor: Norbert Beaujot, Emerald Park (CA)

(73) Assignee: DOT Technology Corp., Emerald Park (CA)

( * ) Notice: Subject to any disclaimer, the term of this patent is extended or adjusted under 35 U.S.C. 154(b) by 0 days.

(21) Appl. No.: 16/935,606

(22) Filed: Jul. 22, 2020

(65) Prior Publication Data

US 2021/0070211 A1    Mar. 11, 2021

Related U.S. Application Data

(63) Continuation of application No. 16/381,201, filed on Apr. 11, 2019, now Pat. No. 10,752,149, which is a (Continued)

(30) Foreign Application Priority Data

Apr. 19, 2016  (CA) .............................. CA 2,927,582
Jan. 23, 2017  (CA) .............................. CA 2,955,638

(51) Int. Cl.
  *B60P 1/64*      (2006.01)
  *A01B 76/00*   (2006.01)
  (Continued)

(52) U.S. Cl.
  CPC ............ *B60P 1/6481* (2013.01); *A01B 73/00* (2013.01); *A01B 76/00* (2013.01); *B65G 41/005* (2013.01);
  (Continued)

(58) Field of Classification Search
  CPC .... B65G 65/42; B65G 65/425; B65G 41/005; B65G 41/008; A01B 73/00; A01B 76/00
  See application file for complete search history.

(56) References Cited

U.S. PATENT DOCUMENTS 3,462,199 A    8/1969   Harris et al.
3,472,322 A   10/1969   Barry
(Continued)

FOREIGN PATENT DOCUMENTS

AU    2017220488    9/2018
CA       2921130    9/2016
(Continued)

OTHER PUBLICATIONS

"Canadian Application Serial No. 2,921,130, Office Action dated Oct. 26, 2016", 3 pgs.
(Continued)

*Primary Examiner* — Kaitlin S Joerger
(74) *Attorney, Agent, or Firm* — Schwegman Lundberg & Woessner, P.A.

(57) ABSTRACT

An agricultural implement for mounting on a U-shaped foundation frame supported on wheels for travel over a ground surface where the foundation frame includes first and second laterally spaced mounting beams fixed to and extending from a base. The implement is configured to perform an agricultural operation, to rest on the ground surface when in an idle position, and to attach to the foundation frame when in an operating position. The implement comprises a rigid implement portion configured to be attached to the first and second mounting beams at first and second beam locations remote from the base such that the first and second mounting beams are prevented from moving laterally with respect to each other.

26 Claims, 7 Drawing Sheets

Related U.S. Application Data continuation of application No. 15/490,027, filed on Apr. 18, 2017, now abandoned.

(51) Int. Cl.
    *B65G 41/00*     (2006.01)
    *B65G 65/42*     (2006.01)
    *A01B 73/00*     (2006.01)

(52) U.S. Cl.
    CPC .......... *B65G 41/008* (2013.01); *B65G 65/42* (2013.01); *B65G 65/425* (2013.01)

(56) References Cited

U.S. PATENT DOCUMENTS

| | | | |
|---|---|---|---|
| 4,036,377 A | 7/1977 | Weber | |
| 4,060,259 A | 11/1977 | Mefferd et al. | |
| 4,260,172 A | 4/1981 | Rettig et al. | |
| 4,271,919 A | 6/1981 | Vaughan | |
| 4,351,428 A | 9/1982 | Long | |
| 4,359,117 A | 11/1982 | Vaughan | |
| 4,367,814 A * | 1/1983 | Young | B65G 21/12 198/301 |
| 4,440,539 A * | 4/1984 | Sullivan | B65G 41/002 198/583 |
| 4,603,775 A | 8/1986 | Plett | |
| 4,650,058 A | 3/1987 | Vaughan | |
| 4,714,149 A | 12/1987 | Tiede | |
| 4,963,066 A | 10/1990 | Boppart | |
| 5,316,338 A | 5/1994 | Wolf et al. | |
| 5,318,444 A | 6/1994 | Kuzub et al. | |
| 6,321,852 B1 | 11/2001 | Pratt | |
| 6,671,582 B1 | 12/2003 | Hanley | |
| 7,191,889 B1 | 3/2007 | Heley | |
| 7,488,149 B2 * | 2/2009 | Waldner | A01C 15/003 198/311 |
| 7,708,131 B2 | 5/2010 | Muth | |
| 7,793,770 B1 | 9/2010 | Schoonover et al. | |
| 7,866,456 B2 * | 1/2011 | Bauman | B65G 33/14 198/311 |
| 8,118,151 B1 * | 2/2012 | Jesse | B65G 33/14 198/315 |
| 8,180,534 B2 | 5/2012 | Burke et al. | |
| 8,272,493 B1 | 9/2012 | Grengs | |
| 8,312,957 B1 * | 11/2012 | Stoltzfus | E04G 21/0418 180/411 |
| 8,365,896 B2 * | 2/2013 | Jesse | B65G 41/008 198/315 |
| 8,396,632 B2 | 3/2013 | Burke et al. | |
| 8,534,982 B2 | 9/2013 | Brainard et al. | |
| 8,584,827 B1 | 11/2013 | Jesse | |
| 9,145,264 B2 | 9/2015 | Houssian et al. | |
| 9,533,612 B2 | 1/2017 | Meenen et al. | |
| 9,596,808 B2 | 3/2017 | Fay et al. | |
| 9,855,876 B2 * | 1/2018 | Affleck | B65G 69/00 |
| 9,932,178 B2 | 4/2018 | Allensworth et al. | |
| 10,368,473 B2 | 8/2019 | Treinen et al. | |
| 10,407,248 B2 | 9/2019 | Rempel et al. | |
| 10,443,251 B2 * | 10/2019 | Eenigenburg | B62D 7/1509 |
| 10,550,694 B2 | 2/2020 | Watson et al. | |
| 10,556,751 B2 | 2/2020 | Peutert et al. | |
| 10,750,652 B2 * | 8/2020 | Beaujot | A01B 51/02 |
| 10,752,149 B2 | 8/2020 | Beaujot | |
| 10,961,728 B2 * | 3/2021 | Eenigenburg | B66C 1/427 |
| 2014/0048381 A1 | 2/2014 | Smith et al. | |
| 2014/0216314 A1 | 8/2014 | Bourgault et al. | |
| 2015/0237803 A1 | 8/2015 | Hilvers et al. | |
| 2016/0244268 A1 | 8/2016 | Ritter | |
| 2017/0297471 A1 | 10/2017 | Beaujot | |
| 2018/0153084 A1 | 6/2018 | Calleija et al. | |
| 2019/0053417 A1 | 2/2019 | Beaujot | |
| 2019/0210807 A1 | 7/2019 | Komelsen et al. | |
| 2019/0232852 A1 | 8/2019 | Beaujot | |
| 2019/0308830 A1 | 10/2019 | Quist | |

FOREIGN PATENT DOCUMENTS

| | | |
|---|---|---|
| CA | 2921130 | 5/2017 |
| CA | 2927582 | 10/2017 |
| CA | 2964610 | 10/2017 |
| CA | 2955638 | 7/2018 |
| CA | 3052153 A1 | 2/2021 |
| CN | 109068577 | 12/2018 |
| DE | 29714523 | 10/1997 |
| EA | 201891745 | 2/2019 |
| EP | 1369007 | 12/2003 |
| EP | 3416469 | 12/2018 |
| IN | 201827034406 | 2/2019 |
| JP | 2019510684 | 4/2019 |
| WO | 9609950 A1 | 4/1996 |
| WO | 2017139892 | 8/2017 |

OTHER PUBLICATIONS

"Canadian Application Serial No. 2,921,130, Response filed Nov. 17, 2016 to Office Action dated Oct. 26, 2016", 9 pgs.

"U.S. Appl. No. 15/490,027, Restriction Requirement dated Apr. 5, 2018", 6 pgs.

"U.S. Appl. No. 15/490,027, Response filed Jun. 4, 2018 to Restriction Requirement dated Apr. 5, 2018", 1 pg.

"U.S. Appl. No. 15/490,027, Non Final Office Action dated Aug. 9, 2018", 8 pgs.

"U.S. Appl. No. 15/490,027, Response filed Nov. 9, 2018 to Non Final Office Action dated Aug. 9, 2018", 6 pgs.

"U.S. Appl. No. 15/490,027, Final Office Action dated Jan. 14, 2019", 8 pgs.

"U.S. Appl. No. 16/381,201, Preliminary Amendment filed Apr. 11, 2019", 11 pgs.

"International Application Serial No. PCT CA2017 050202, International Search Report dated May 19, 2017", 4 pgs.

"International Application Serial No. PCT CA2017 050202, Written Opinion dated May 19, 2017", 4 pgs.

"International Application Serial No. PCT CA2017 050202, International Preliminary Report on Patentability dated Aug. 30, 2018", 6 pgs.

"International Application Serial No. PCT CA2017 050202, Invitation to Pay Additional Fees dated Mar. 7, 2017", 2 pgs.

"European Application Serial No. 17752606.8, Response filed Sep. 28, 2018 to Communication Pursuant to Rules 161(1) and 162 EPC dated Sep. 25, 2018", 92 pgs.

"European Application Serial No. 17752606.8, Extended European Search Report dated Sep. 23, 2019", 7 pgs.

"European Application Serial No. 17752606.8, Response filed Dec. 4, 2019 to Extended European Search Report dated Sep. 23, 2019", 92 pgs.

"U.S. Appl. No. 16/077,775, Preliminary Amendment filed Aug. 14, 2018", 14 pgs.

"Eurasian Application Serial No. 201891745, Office Action dated Nov. 29, 2019".

"Eurasian Application Serial No. 201891745, Response filed Feb. 14, 2020 to Office Action dated Nov. 29, 2019", w English Claims, 25 pgs.

"U.S. Appl. No. 16/077,775, Notice of Allowance dated Apr. 15, 2020", 6 pgs.

"U.S. Appl. No. 16/381,201, Notice of Allowance dated Apr. 22, 2020", 9 pgs.

"U.S. Appl. No. 16/077,775, Supplemental Notice of Allowability dated Jun. 12, 2020", 2 pgs.

Beaujot, Norbert, "Agricultural implement and ramp attachment system", U.S. Appl. No. 15/190,027 filed Apr. 18, 2017, (Apr. 18, 2017), 28 pgs.

U.S. Appl. No. 15/490,027, filed Apr. 18, 2017, Agricultural Implement and Ramp Attachment System.

U.S. Appl. No. 16/381,201 U.S. Pat. No. 10,752,149, filed Apr. 11, 2019, Agricultural Implement and Ramp Attachment System.

"Canadian Application Serial No. 2,927,582, Office Action dated Jun. 29, 2021", 11 pgs.

(56) References Cited

OTHER PUBLICATIONS

"Canadian Application Serial No. 2,964,610, Office Action dated May 27, 2021", 4 pgs.
"Canadian Application Serial No. 2,964,610, Response filed Sep. 27, 2021 to Office Action dated May 27, 2021", 12 pgs.
"Canadian Application Serial No. 2,927,582, Response filed Oct. 27, 2021 Office Action dated Jun. 29, 2021", 28 pgs.

* cited by examiner

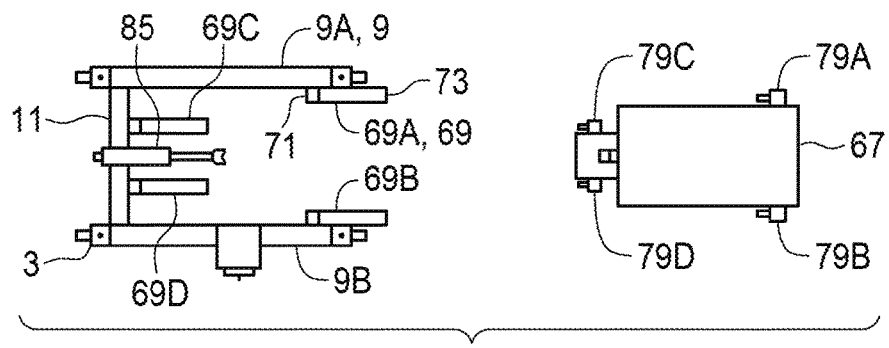
FIG. 12
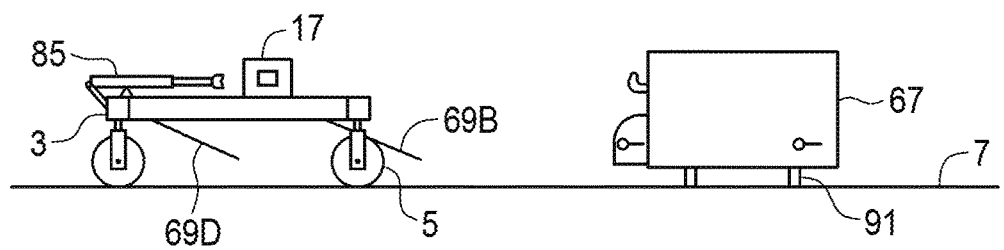
FIG. 13
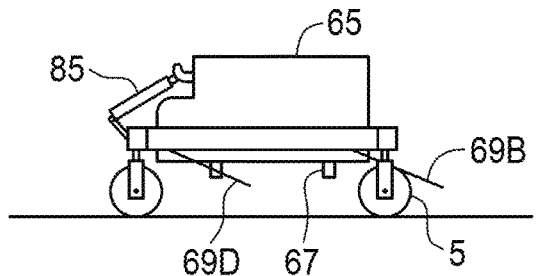
FIG. 14
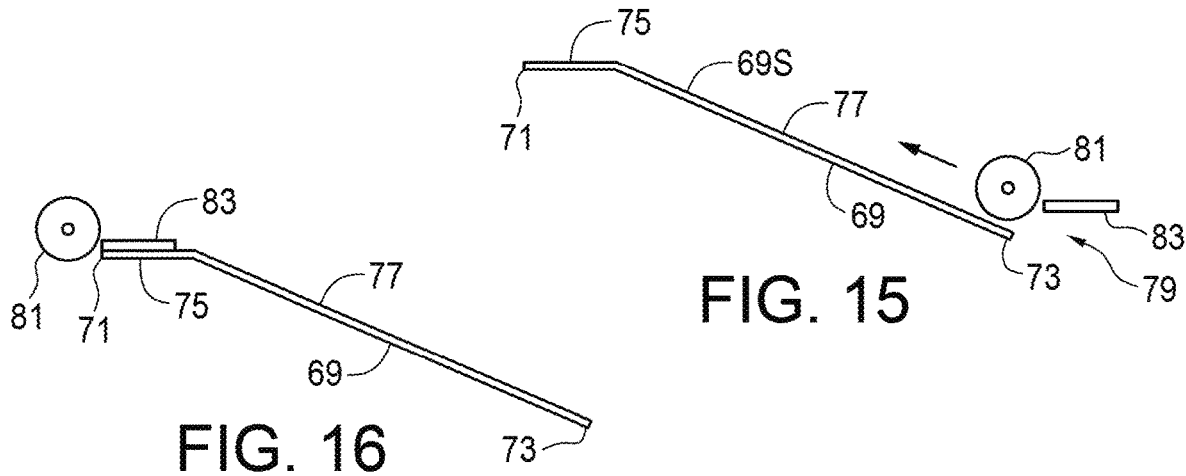
FIG. 15
FIG. 16

AGRICULTURAL IMPLEMENT AND RAMP ATTACHMENT SYSTEM

CROSS-REFERENCE TO RELATED APPLICATIONS

This application is a continuation of U.S. patent application Ser. No. 16/381,201, filed Apr. 11, 2019, which claims priority to U.S. patent application Ser. No. 15/490,027, filed Apr. 18, 2017, which claims priority to CA Patent Application No. 2,927,582 filed Apr. 19, 2016 and CA Patent Application No. 2,955,638 filed Jan. 23, 2017, the entire contents of each of which are heareby incorporated by reference.

This disclosure relates to the field of agricultural implements and in particular an implement configured to perform a wide variety of agricultural operations and to be attached to a foundation frame supported on wheels.

BACKGROUND

Implements such as are used in agriculture and various industries such as road construction and maintenance include a wide variety of sizes and configurations.

Implements such as combines, swathers, sprayers, road graders, earth movers, and the like are commonly self-propelled, with the engine, drive system, and operators station incorporated into the implement itself. Implements such as air seeders, cultivators, discs, grain carts, mowers, and the like are more commonly towed behind a tractor. Some implements are configured to be mounted directly on a tractor instead of being towed behind, such as snowplows mounted on the front end of a tractor, mowers mounted under a middle portion of the tractor, and a wide variety of implements mounted to the arms of a three point hitch system commonly incorporated on the rear end of tractors.

Canadian Patent Application Number 2,921,130 of the present inventor Beaujot discloses an implement operating apparatus comprising a drive frame supported on drive wheels for travel on a ground surface. A motor is mounted on the drive frame and rotates the drive wheels as well as providing power for controls and various implements that are attached to the drive frame. The drive frame includes a base beam and right and left substantially parallel side mounting beams extending from corresponding right and left ends of the base beam.

SUMMARY OF THE INVENTION

The present disclosure provides an agricultural implement apparatus that overcomes problems in the prior art.

In a first embodiment the present disclosure provides an agricultural implement for mounting on a U-shaped foundation frame supported on wheels for travel over a ground surface where the foundation frame includes first and second laterally spaced mounting beams fixed to and extending from a base. The implement is configured to perform an agricultural operation, to rest on the ground surface when in an idle position, and to attach to the foundation frame when in an operating position. The implement comprises a rigid implement portion configured to be attached to the first and second mounting beams at first and second beam locations remote from the base such that the first and second mounting beams are prevented from moving laterally with respect to each other.

In a second embodiment the present disclosure provides an agricultural implement apparatus for mounting on a U-shaped foundation frame supported on wheels for travel over a ground surface where the foundation frame includes a base beam and first and second substantially parallel and laterally spaced mounting beams fixed to and extending in a like direction from corresponding first and second ends of the base beam. The apparatus comprises an operating implement configured to perform an agricultural operation and including a rigid structural member. A support assembly is configured to support the operating implement in an idle position on the ground surface. The rigid structural member is configured to be attached to the first and second side beams at corresponding first and second beam locations remote from the base beam such that the first and second mounting beams are substantially prevented from moving laterally with respect to each other.

In a third embodiment the present disclosure provides an implement operating system comprising a foundation frame; a plurality of wheels supporting the foundation frame for travel on a ground surface; an implement configured to rest on the ground surface when in an idle position; a ramp member attached to one of the foundation frame and the implement, the ramp member including an upward sloping bearing surface; and a support member attached to the other of the foundation frame and the implement. The implement and the foundation frame are configured such that when the foundation frame is maneuvered to an implement loading position with respect to the implement in the idle position, the implement is connectable to the foundation frame and movable to an operating position supported by the foundation frame where the selected implement is connectable to an implement control system operative to control implement functions, and where the steering and drive controls are operative to move and steer the foundation frame and selected implement along the travel path. When the foundation frame is in the implement loading position the support member is aligned with the ramp member and the implement is moved to the operating position by moving the foundation frame and implement toward each other such that the support member bears against the bearing surface of the ramp member and exerts an upward force on the implement and as the foundation frame and implement move toward each other the support member moves along the bearing surface of the ramp member such that the implement moves upward to the operating position.

In a fourth embodiment the present disclosure provides a system for loading granular material into a fill opening of a bin. The system comprises a conveyor mounted on wheels for movement along a ground surface, the conveyor including an upper conveyor discharge and a lower conveyor intake. A conveyor control system is operative to move and steer the conveyor and to selectively raise and lower the conveyor intake and the conveyor discharge. A location system is connected to the conveyor control system and operative to guide the conveyor to a bin loading position where the conveyor discharge is oriented to discharge into the bin fill opening and the conveyor intake is oriented to receive granular material from an incoming transport vehicle.

The disclosed implement apparatus provides structural rigidity to a foundation frame which includes mounting beams extending from a base to form a U-shape enclosing an open implement area. With no connection between the first and second mounting beams except at the base beam, there is a clear space between the mounting beams which facilitates loading of implements that extend above the mounting beams however since the mounting beams are connected to each other only at their ends fixed to the base beam, forces exerted on the opposite outer ends thereof can put severe stresses on the connection to the base beam. Attaching the rigid structural member to outer portions of the mounting beams prevents lateral movement of one beam with respect to the such that lateral forces on the outer end of one beam are resisted by both beams.

The present disclosure further provides an agricultural implement comprising corresponding beam and implement attachment mechanisms which provides a secure mounting of the implement to the foundation frame, as well as providing a rigid implement connected to each beam such that lateral movement of one mounting beam with respect to the other is prevented. The implement also provides a simple and effective implement moving mechanism to raise the implement from the idle position supported on the ground to the operating position supported on the foundation frame.

A system is also provided to move and guide a conveyor to a bin loading position where the conveyor discharge is oriented to discharge into the bin fill opening and the conveyor intake is oriented to receive granular material from an incoming transport vehicle.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 12 is a schematic top view of the foundation frame of FIG. 1 and an implement in the idle position with a ramp raising system installed thereon;

FIG. 13 is a schematic side view of the foundation frame and implement in the idle position with ramp raising system of FIG. 12;

FIG. 14 is a schematic side view of the foundation frame and implement of FIG. 12 with the implement in the operating position supported on the foundation frame;

FIG. 15 is a schematic side view of a support member mounted on the implement of FIG. 12 moving up a ramp member of the ramp raising system;

FIG. 16 is a schematic side view of the support member of FIG. 15 with the implement in the operating position;

DETAILED DESCRIPTION OF THE ILLUSTRATED EMBODIMENTS

Figure 1:
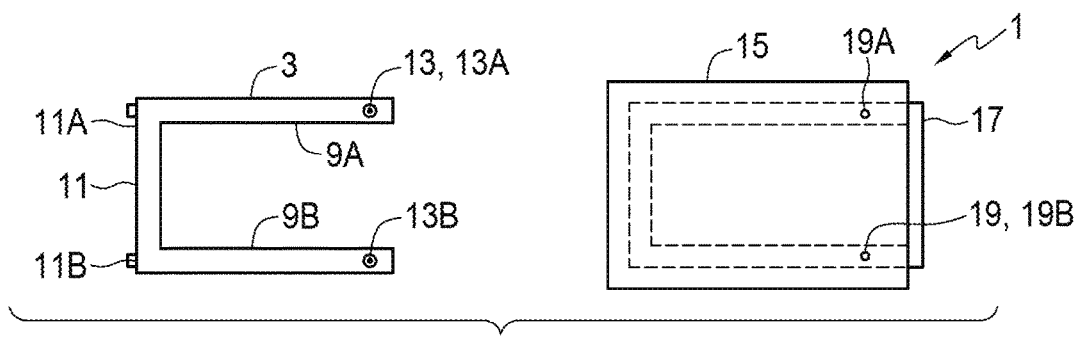
FIG. 1 is a schematic top view of a foundation frame adjacent to an embodiment of the agricultural implement apparatus of the present disclosure.

FIGS. 1-5 schematically illustrate an embodiment of an agricultural implement apparatus 1 of the present disclosure for mounting on a U-shaped foundation frame 3 supported on wheels 5 for travel over a ground surface 7. A foundation frame 3 includes first and second laterally spaced mounting beams 9A, 9B fixed to and extending from a base, illustrated here as a base beam 11, and with no connection between the first and second mounting beams 9A, 9B except at the base beam 11. The foundation frame 3 may be self-propelled to move an implement 15 over a field to perform an agricultural operation, or may simply be a foundation platform providing a wheeled support frame to which various implements can be connected.

The apparatus 1 includes first and second beam attachment mechanisms 13A, 13B adapted to be mounted on the corresponding first and second mounting beams 9A, 9B at beam locations remote from the base beam 11. The various beam attachment mechanisms 13 described can be attached to the beams 9 by welding or with plates and bolts and the like suitably configured.

The apparatus 1 includes an operating implement 15 configured to perform an agricultural operation. The illustrated implement 15 is a grain tank configured to receive and dispense granular material such as harvested crops, and when mounted on the foundation frame 3, to transport the granular material.

In the illustrated apparatus 1 the first and second mounting beams 9A, 9B are laterally spaced and substantially parallel and extend in a like direction from corresponding first and second ends 11A, 11B of the base beam 11. The apparatus 1 includes a rigid implement portion that is configured to be attached to the mounting beams 9 by the beam attachment mechanisms 13 such that the first and second mounting beams 9A, 9B are prevented from moving laterally with respect to each other.

In the illustrated apparatus 1 the rigid implement portion is provided by a rigid structural member 17, here the frame forming part of the operating implement 15, that is configured to be attached to the first and second beam attachment mechanisms 13A, 13B mounted on the corresponding first and second mounting beams 9A, 9B at fixed beam locations remote from the base beam 11 such that the mounting beams 9 are substantially locked in a position that is fixed with respect to each other and with respect to the rigid structural member 17. In the illustrated apparatus 1 first and second implement attachment mechanisms 19A, 19B are mounted on the rigid structural member 19 at locations corresponding to the beam locations where the first and second beam attachment mechanisms 13, 13B have been attached.

Figure 3:
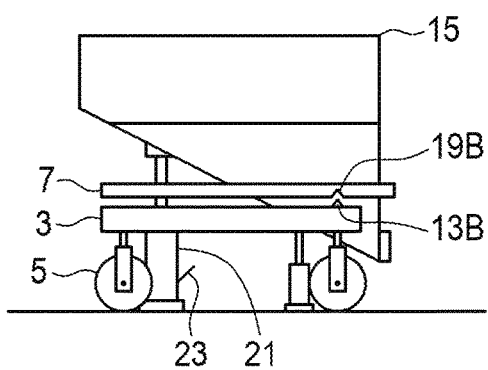
FIG. 3 is a schematic side view the foundation frame in a loading position with respect to the agricultural implement apparatus of FIG. 1, where the agricultural implement apparatus is in the idle position supported on the ground.
Figure 5:
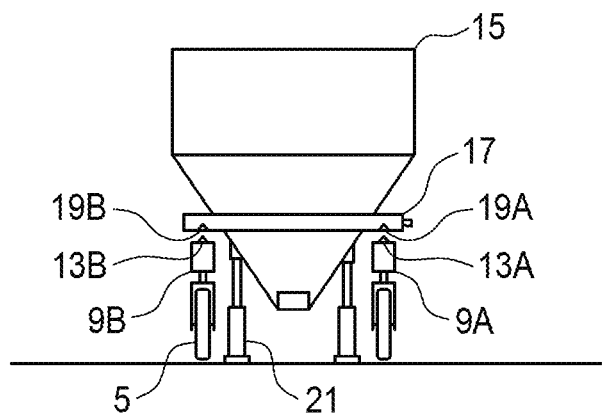
FIG. 5 is a schematic end view of the foundation frame in loading position with respect to the agricultural implement apparatus shown in FIG. 3, where the agricultural implement apparatus is in the idle position supported on the ground.

When the foundation frame 3 is in the loading position with respect to the implement 15 as schematically illustrated in FIG. 3, the first and second implement attachment mechanisms 19A, 19B are directly above the corresponding first and second beam attachment mechanisms 13A, 13B. The illustrated implement 15 is configured such that when the foundation frame 3 is in the loading position as seen in FIG. 5, the implement 15 is between and above the first and second mounting beams 9A, 9B.

Figure 2:
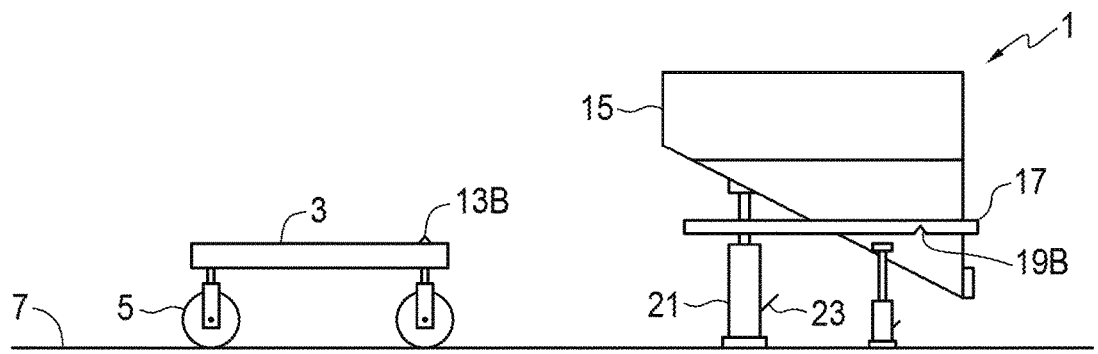
FIG. 2 is a schematic side view of the foundation frame and agricultural implement apparatus as shown in the top view of FIG. 1.

The apparatus 1 includes a support assembly, illustrated as hydraulic jacks 21 configured to support the operating implement 15 in an idle position on the ground surface 7 as shown in FIGS. 1-3. The apparatus 1 further includes an implement moving mechanism operative, when the foundation frame 3 is in the loading position with respect to the implement 15 as illustrated in FIGS. 3 and 5, to move the implement 15 vertically upward or downward from the position of FIGS. 3 and 5 to the position of FIG. 4 where the weight of the implement is transferred wholly from the ground surface 7 to the foundation frame 3. In the schematically illustrated apparatus 1 the implement moving mechanism is provided by jack handles 23 that extend or retract the hydraulic jacks 21. It is contemplated that the hydraulic jacks 21 could also be connected to a hydraulic power source of the foundation frame 3 when the foundation frame 3 is in the loading position.

Figure 4:
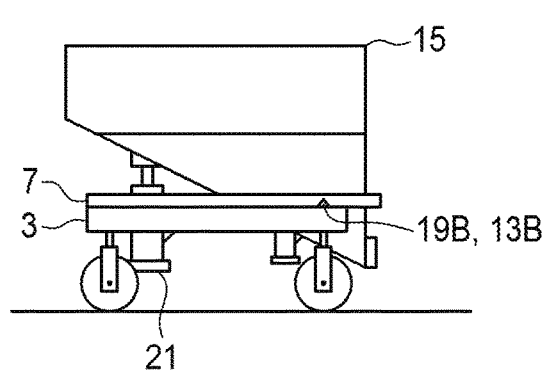
FIG. 4 is a schematic side view of the agricultural implement apparatus of FIG. 1 wholly supported on the foundation frame with the support assembly raised above the ground.

In the illustrated apparatus 1 the jack handles 23 are manipulated to move the implement 15 downward such that the first implement attachment mechanism 19A bears against the first beam attachment mechanism 13a and the second implement attachment mechanism 19B bears against the second beam attachment mechanism 13B as shown in FIG. 4. The jack handles 23 are manipulated such that the weight of the implement 15 is wholly transferred from the ground surface 7 to the foundation frame 3, and then further such that the hydraulic jacks 21 move off the ground surface 7 as shown in FIG. 4.

It is contemplated as well that in some configurations of the implement, the implement moving mechanism will move the implement upward so that the first implement attachment mechanism bears upward against the first beam attachment mechanism and the second implement attachment mechanism bears upward against the second beam attachment mechanism, and the two are connected together.

Figure 6:
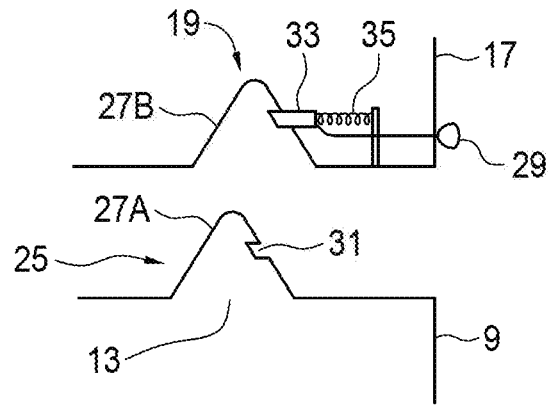
FIG. 6 is a schematic sectional view of a latch assembly which can be used to provide the beam attachment mechanisms and the implement attachment mechanisms.

In the illustrated apparatus 1 the beam attachment mechanisms 13 and the implement attachment mechanisms 19 can be conveniently provided by cooperating latch mechanisms 25 as schematically illustrated in FIG. 6. The latch mechanisms 25 are provided by conical projections 27A extending upward from the top surface of the mounting beams 9 and corresponding conical recesses 27B in the rigid structural member 17. As the rigid structural member 17 moves downward the conical projection 27A enters the conical recess 27B and further downward movement moves the conical projection 27A and recess 27B into full engagement in the correct alignment. The implement 15 is attached to the first and second mounting beams 9 when the implement attachment mechanisms 19 bear against the beam attachment mechanisms 13 to engage the latch mechanisms 25.

Correct alignment of the rigid structural member 17, and thus the implement 15, with the foundation frame 3 is facilitated since the conical projection 27A can enter an edge of the conical recess 27B and will be forced into alignment as the conical projection 27A moves fully into the conical recess 27B.

Further a lock recess 31 can be provided in the conical projection 27A configured to receive a lock member 33 that is biased by a spring 35 or the like when the conical projection 27A and recess 27B are fully engaged. A latch release 29 is mounted on the open side of the rigid structural member 17.

The illustrated latch members 25 prevent lateral movement of one beam 9 with respect to the other however up and down movement of one mounting beam 9 with respect to the other is not significantly reduced.

Figure 7:
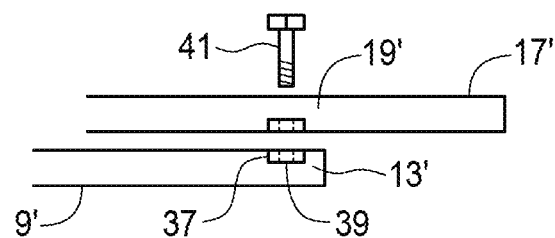
FIGS. 7 and 8 are respectively schematic side and top views of plates defining holes and connected by a bolt which can be used to provide the beam attachment mechanisms and the implement attachment mechanisms.
Figure 8:
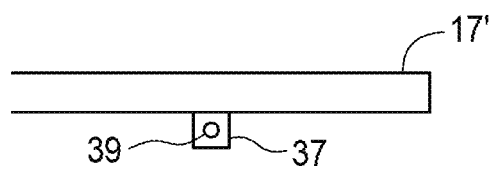

FIGS. 7 and 8 schematically illustrate an alternate arrangement wherein the beam attachment mechanisms 13' and the implement attachment mechanisms 19' comprise plates 37 attached to the rigid structural member 17' and to the mounting beams 9' and defining mounting holes 39. The implement via the rigid structural member 17' is attached to the mounting beams 9' by a bolt 41 through the holes 39 in the plates 37.

Figure 9:
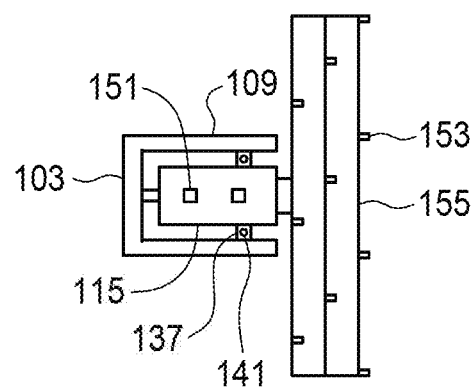
FIG. 9 is a schematic top view of the foundation frame connected to an implement configured to seed a crop.

The implement apparatus 1 can be configured to perform a variety of agricultural operations. FIG. 9 schematically illustrates an implement 115 comprising agricultural product tanks 151 mounted to the mounting beams 109 of the foundation frame 103 by plates 137 and bolts 141. Furrow openers 153 are mounted on a laterally extending implement frame 155 and the implement 115 is configured to seed a crop.

Figure 10:
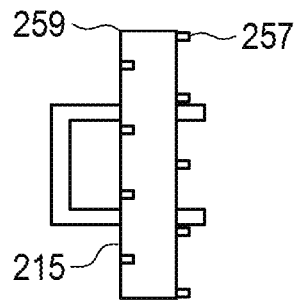
FIG. 10 is a schematic top view of the foundation frame connected to an implement configured to cultivate a field surface.

FIG. 10 schematically illustrates an implement 215 comprising cultivator shanks 257 mounted on a laterally extending implement frame 259 and configured to cultivate a field surface.

Figure 11:
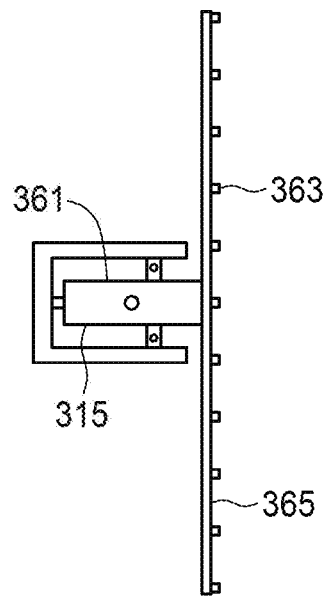
FIG. 11 is a schematic top view of the foundation frame connected to an implement configured spray liquid chemicals on a crop.
Figure 17:
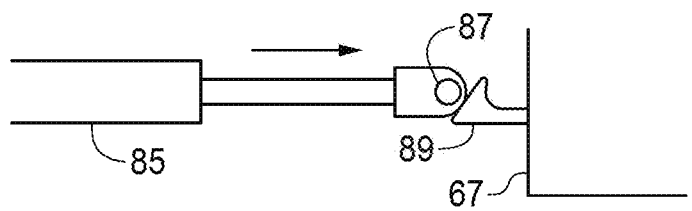
FIG. 17 is a schematic side view of the extendable connection actuator of the ramp raising system of FIG. 12 extending to engage a hook on the implement.
Figure 18:
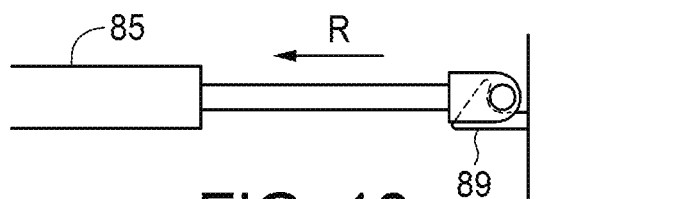
FIG. 18 is a schematic side view of the extendable connection actuator of FIG. 17 engaged with the hook on the implement.

FIG. 11 schematically illustrates an implement 315 comprising a liquid tank 361 and sprayer nozzles 363 mounted on a laterally extending sprayer boom 365 and configured to spray liquid chemicals on a crop.

The disclosed implement apparatus 1 adds structural rigidity to a foundation frame which includes mounting beams 9 extending from a base, such as a base beam 11. With no connection between the first and second mounting beams 9A, 9B except at the base beam 11, there is a clear space between the mounting beams 9 which facilitates loading of implements that extend above the mounting beams 9, such as the grain tank 15 however since the mounting beams 9 are connected to each other only at their ends fixed to the base beam 11 forces exerted on the opposite outer ends thereof can put severe stresses on the connection to the base beam 11. By attaching the rigid structural member 17 to outer portions of the mounting beams 9, lateral movement of one beam with respect to the other is prevented and so lateral forces on the outer end of one beam 9 are resisted by both beams 9A. 9B.

It is contemplated that in the operations contemplated up and down movement of one mounting beam 9 with respect to the other will not subject the connection of the mounting beams 9 to the base beam to excessive forces.

FIGS. 12-16 schematically illustrate a ramp raising system installed on the foundation frame 3 and implement 67 for raising the implement 67 off the ground surface 7 and up to the operating position supported on the foundation frame 3. The raising system comprises a plurality of ramp members 69 attached to one of the foundation frame 3 and the implement 67, each ramp member 69 including a sloping bearing surface 69S, and a corresponding plurality of support members 79 attached to the other of the foundation frame 3 and the implement 67. The ramp members 69 and the support members 79 are configured such that as the implement 67 moves toward the operating position, each support member 79 bears against the sloping bearing surface 69S of the corresponding ramp member 69 and exerts an upward force on the implement 67.

FIGS. 12-16 schematically illustrate a system where the ramp members 69 are mounted on the foundation frame 3 and the support members 79 are mounted on the implement 67. In this arrangement the sloping bearing surface 69S of the ramp members 69 is the top surface. First and second ramp members 69A, 69B are attached to corresponding first and second side beams 9A, 9B. Each ramp member 69 extends substantially parallel to the corresponding side beam 9 from a base end 71 thereof that is nearest the base beam 11, to a remote end 73 thereof. Each ramp member 69 comprises a substantially horizontal flat portion 75 extending from the base end 71 thereof to a midpoint thereof, and an inclined portion 77 sloping downward from the midpoint to the remote end 73 of the ramp member 69.

The raising system further comprises first and second support members 79A, 79B attached to sides of the implement 67 and are configured to move up the sloping inclined portions 77 of the corresponding first and second ramp members 69A, 69B as the implement 67 moves toward the operating position. When the implement 67 is moved all the way to the operating position of FIG. 14 it is supported on the flat portions 75 of the ramp members when in the operating position as seen in FIG. 16.

The illustrated support members 79 each comprise a support wheel 81 configured to roll along the corresponding ramp member 69, and a support surface 83 adjacent to and above a bottom edge of the support wheel 81 as schematically illustrated in FIG. 15. Thus as the support wheel 81 rolls up ramp member 69 the support surface 83 is above the ramp member 69 as seen in FIG. 15. When the implement 67 moves into the operating position of FIG. 14, each wheel 81 moves beyond the base end 71 of the corresponding ramp member 69 so that the wheel 81 no longer keeps the support surface 83 above the ramp member 69, and instead each support surface 83 rests on the corresponding flat portion 75 of each ramp member 69 supporting the implement 67 when the implement 67 is in the operating position.

An extendable connection actuator 85 is attached to the foundation frame 3 and is releasably attachable to the implement 67 by a pin 87 engaging a hook 89 on the implement 67. As the actuator 85 extends the pin 87 rides over the top of the hook 89 and then falls down behind the hook 89. Retracting the actuator 85, typically a hydraulic cylinder, then pulls the implement 67 toward the foundation frame 3 such that the support members 79 move up the ramp members 69 and the implement 67 moves to the operating position. Extending the actuator 85 will push the support members 79 away from the foundation frame 3 such that the support wheels 81 again roll up onto the ramp members 69 and down to move the implement 67 to the idle position. The actuator 85 can also be configured as a constantly pressurized hydraulic cylinder so that same exerts a substantially constant force on the hook 89 in the retracting direction R to keep the implement 67 in the operating position.

The implement 67 is supported in the idle position by legs 91. In the operating position the legs 91 are sufficiently far above the ground 7 that they will not interfere with implement operations. Further ramp members 69 can be attached to the foundation frame 3 at convenient locations, each with a corresponding support member 79 mounted on the implement 67. In the illustrated foundation frame 3, third and fourth ramp members 69C, 69D are attached to the base beam 11, and wherein the implement 67 comprises a corresponding third and fourth support members 79C, 79D configured to move up the inclined portion of the ramp members 69C, 69D as the implement 67 moves toward the operating position.

Figure 19:
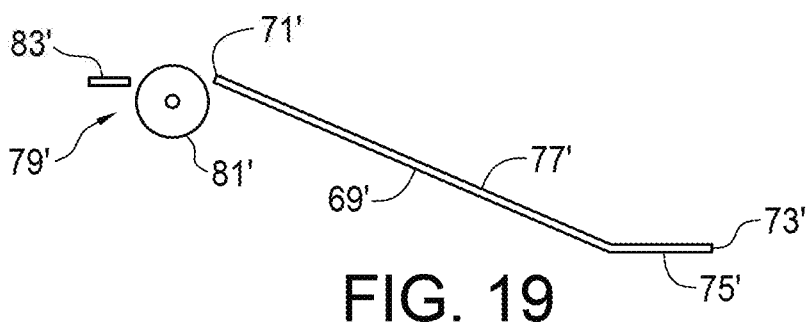
FIG. 19 is a schematic side view of a support member mounted on a foundation frame as schematically illustrated in FIG. 21 and moving up a ramp member mounted on an implement.
Figure 20:
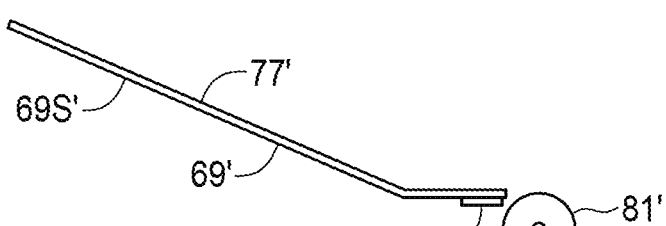
FIG. 20 is a schematic side view of the support member and ramp member of FIG. 19 when the implement is in the operating position.
Figure 21:
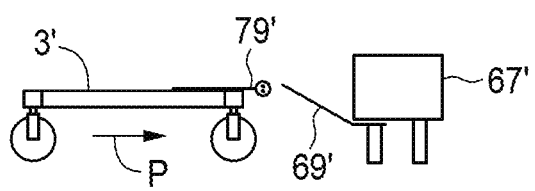
FIG. 21 is a schematic side view of a ramp raising system where a support member is mounted on the foundation frame and a corresponding ramp member is mounted on the implement.

FIGS. 19-21 schematically illustrate an alternate system where the support members 79' are mounted on the foundation frame 3' and the ramp members 69' are mounted on the implement 67'. In this arrangement the sloping bearing surface 69S' of the ramp members 69' is the bottom surface. Each ramp member 69' extends substantially parallel to the path P of the foundation frame 3' from a base end 71' thereof that is nearest the base beam 11' of the approaching foundation frame 3', to a remote end 73' thereof. Each ramp member 69' again comprises a substantially horizontal flat portion 75' extending from the remote end 73' thereof to a midpoint thereof, and an inclined portion 77' sloping upward from the midpoint to the base end 71' of the ramp member 69'.

Figure 22:
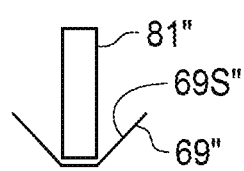
FIG. 22 is a schematic end view of a support wheel rolling along a trough shaped bearing surface of a ramp member.

Thus it can be seen that a plurality of ramp members 69, 69' and a corresponding number of support members 79, 79' can be mounted on either or both of the foundation frame 3, 3' and implement 67, 67' as required by the configuration of various implements. To facilitate proper alignment of the implement and foundation frame, FIG. 22 schematically illustrates the sloping bearing surface 69S'' of the ramp member 69" formed as a trough with a flat bottom generally the same width as the width of the support wheel 81". If slightly misaligned when contacting the bearing surface 69S", the wheel 81" will slide to the bottom of the trough in the desired aligned position.

Figure 25:
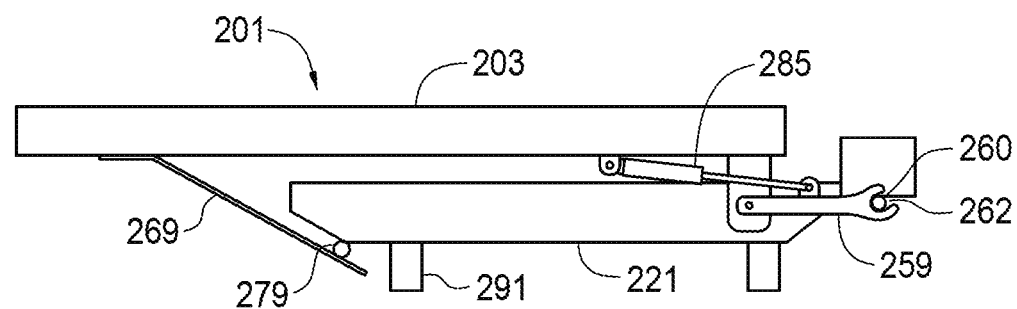
FIG. 25 is a schematic side view showing the implement in the idle position with the foundation frame in the implement loading position and using an alternate loading system where the implement is moved to the operating position supported on the foundation frame by a combination of a raising arm and ramp member.
Figure 26:
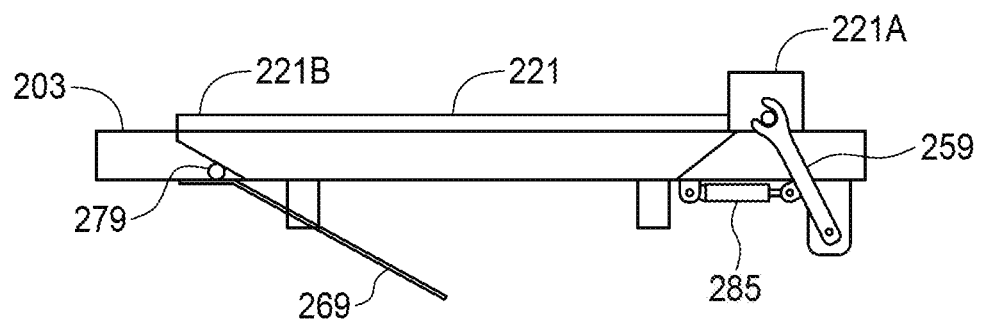
FIG. 26 is a schematic side view of the alternate loading system of FIG. 25 with the implement in the operating position supported on the foundation frame.

FIGS. 25 and 26 illustrate a system 201 using a ramp member 269 in combination with a raising arm 259 to move an implement 221 from the idle position of FIG. 25 to the operating position of FIG. 26 supported on the foundation frame 203. The support member 279 is mounted on the implement 221 and configured to engage the ramp member 269 about the same time as the pin 260 on the implement 221 engages the recess 262 in the raising arm 259. The actuator hydraulic cylinder 285 is then retracted moving the raising arm 259 and pin 260 up to move the first end 221A of the implement 221 up and toward the foundation frame 203 and also moves the support member 279 upward along the ramp member 269. Constant hydraulic pressure retracting the actuator hydraulic cylinder 285 keeps the implement in the operating position, and when it is desired to move the implement 221 off the foundation frame 203 into the idle position resting on legs 291 the actuator hydraulic cylinder 285 is simply extended.

Thus the system 201 utilizes a combination of the ramp members 69 shown in FIG. 12 and a raising arm 259 with the actuator hydraulic cylinder 285 performing the function of the hydraulic connection actuator of FIGS. 12-20. Other such combinations of the described arrangements are contemplated as well.

Figure 23:
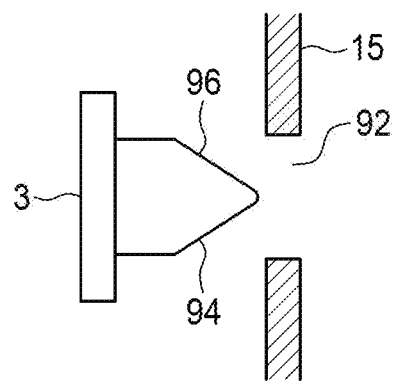
FIG. 23 is a schematic sectional side view of a guide member entering a guide aperture to align an implement and foundation frame.
Figure 24:
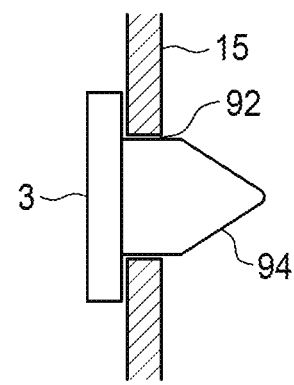
FIG. 24 is a schematic sectional side view of the guide member of FIG. 23 fully engaged in the guide aperture and substantially filling the guide aperture.

Further to facilitate alignment, FIGS. 23 and 24 schematically illustrate a guide system comprising a circular guide aperture 92 defined in the selected implement 15, and a conical guide member 94 extending from the foundation frame 3. The opposite arrangement with the circular guide aperture 92 defined in the foundation frame 3, and the conical guide member 94 extending from the selected implement 21 will function equally as well. The guide member 94 and the guide aperture 92 are configured such that as the implement moves toward the operating position as seen in FIG. 23, the guide member 94 enters the guide aperture 92, and when the implement 21 is in the operating position the guide member 94 substantially fills the guide aperture 92 as seen in FIG. 24. Thus slight misalignments are corrected when the implement achieves the operating position. The guide member 94 and guide aperture 92 can be oriented vertically or horizontally however with the guide member 94 extending horizontally as illustrated, when the guide member 94 enters the guide aperture 92, the conical edge 96 bears against the top of the guide aperture 92 and forces the implement 15 upward, such that when the implement 15 is in the operating position, the implement 15 bears downward on the guide member 94 and is supported on the foundation frame 3.

Figure 27:
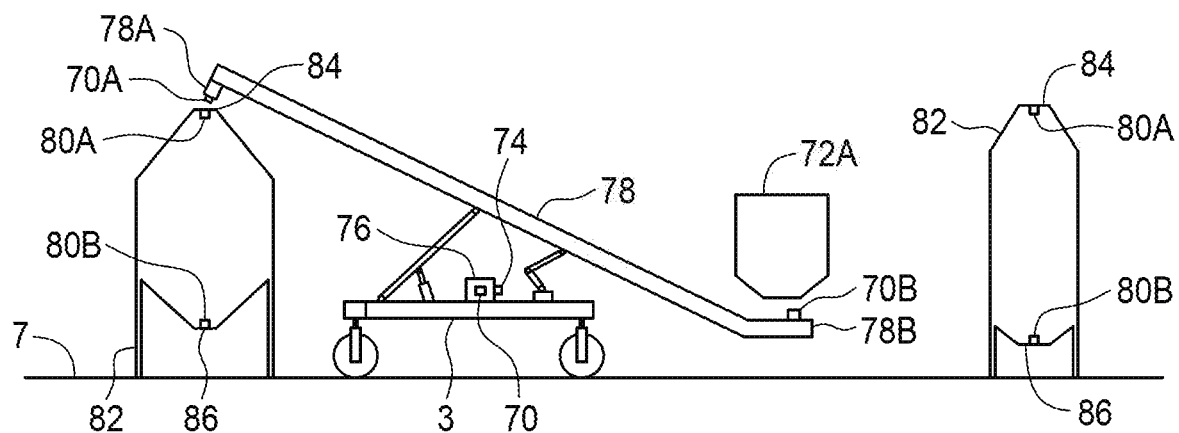
FIG. 27 is a schematic side view of a conveyor implement mounted on the drive frame with homing devices mounted on the conveyor intake and discharge and corresponding homing devices mounted on the fill and discharge openings of bins, and with a receiver to receive location signals from global positioning satellites, and with the conveyor discharge oriented to receive granular material from a transport vehicle and discharge the granular material into the bin fill opening.
Figure 28:
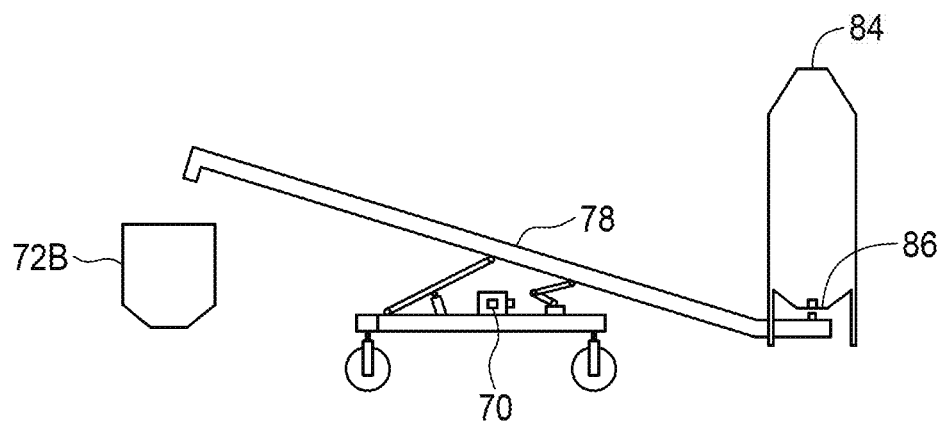
FIG. 28 is a schematic side view of the conveyor implement of FIG. 27 with the conveyor intake oriented to receive granular material from the bin discharge opening, and discharge the granular material into a transport vehicle.

A system for loading granular material into a fill opening of a bin 82 is schematically illustrated in FIGS. 27 and 28. The system comprises a conveyor 78 mounted on wheels for movement along the ground surface 7. The conveyor 78 includes an upper conveyor discharge 78A and a lower conveyor intake 78B. A conveyor control system 76 is operative to move and steer the conveyor and to selectively raise and lower the conveyor intake and the conveyor discharge. A location system 74 is connected to the conveyor control system and is operative to guide the conveyor to a bin loading position shown in FIG. 27 where the conveyor discharge 78A is oriented to discharge into the bin fill opening 84 and the conveyor intake 78B is oriented to receive granular material from an incoming transport vehicle 72A. The conveyor control system 76 could be partially manually controlled, with an operator responding to signals from the location system, or fully automated.

The illustrated location system is further operative to guide the conveyor 78 to a bin unloading position illustrated in FIG. 28 where the conveyor intake 78B is oriented to receive granular material from a bin discharge opening 86 and the conveyor discharge 78A is oriented to discharge granular material into an outgoing transport vehicle 72B.

The location system can comprise a global positioning satellite receiver 70 mounted on the conveyor 78 and operative to determine a conveyor discharge location of the conveyor discharge 78A and a conveyor intake location of the conveyor intake 78B, and wherein a bin fill location of the bin fill opening 84 and a bin discharge location of the bin discharge opening 86 are programmed into the location system.

Figure 29:
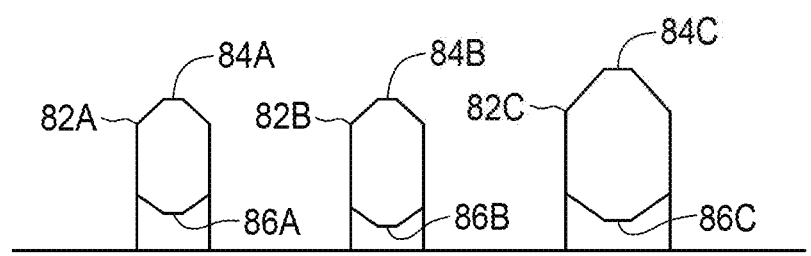
FIG. 29 is a schematic side view of a plurality of bins with homing devices mounted on the fill and discharge openings.

FIG. 29 schematically illustrates a plurality of bins 82A, 82B, 82C, where bin fill locations corresponding to bin fill openings 84A, 84B, 84C, and bin discharge locations corresponding to bin discharge openings 86A, 86B, 86C are programmed into the location system 74 and the location system is operative to guide the conveyor 78 to the bin loading and unloading positions with respect to each bin.

Alternatively as schematically illustrated in FIG. 27 the location system 74 can include a bin fill homing device 80A mounted adjacent to the bin fill opening 84 and a bin discharge homing device 80B mounted adjacent to the bin discharge opening 86. A conveyor discharge homing device 70A is mounted adjacent to the conveyor discharge 78A and a conveyor intake homing device 70B mounted adjacent to the conveyor intake 78B and the devices 70A, 70B connect through the location system 74 to the conveyor control system 76 to move and steer the conveyor 78.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An implement operating apparatus comprising:
   a frame configured for coupling with an agricultural implement, the frame includes:
   an implement socket including opposed frame members and an open end; and
   wherein the implement socket surrounds an open implement area configured to receive the agricultural implement;
   a plurality of ground engaging elements;
   a power source in communication with the plurality of ground engaging elements;
   the agricultural implement configured for reception within the implement socket;
   wherein the frame is configured to transition between an empty position and an operating position:
   in the empty position the open implement area of the implement socket is empty; and
   in the operating position the implement socket is positioned around the agricultural implement within the open implement area, and the agricultural implement is coupled across the opposed frame members; and
   a latch mechanism:
   a projection recess associated with one of the agricultural implement or the frame;

a projection associated with the other of the frame or the agricultural implement; and
wherein the latch mechanism is configured to guide coupling of the agricultural implement across the opposed frame members.

2. The implement operating apparatus of claim 1, wherein in the operating position the agricultural implement is coupled across the opposed frame members proximate to the open end of the implement socket.

3. The implement operating apparatus of claim 1, wherein the frame includes a base member and the opposed frame members extend from the base member, and in the operating position the agricultural implement is coupled across the opposed frame members remotely relative to the base member.

4. The implement operating apparatus of claim 1, wherein the agricultural implement includes at least one structural member, and the at least one structural member is coupled between the opposed frame members in the operating position.

5. The implement operating apparatus of claim 4, wherein in the operating position the at least one structural member supports the opposed frame members.

6. The implement operating apparatus of claim 4, wherein in the operating position the at least one structural member constrains movement of the opposed frame members relative to each other.

7. The implement operating apparatus of claim 1 comprising a beam attachment mechanism coupled with the opposed frame members, and the beam attachment mechanism is configured to couple the opposed frame members with the agricultural implement.

8. The implement operating apparatus of claim 1, wherein the frame encloses a portion of the agricultural implement in the operating position.

9. The implement operating apparatus of claim 1, wherein the opposed frame members include mounting beams.

10. The implement operating apparatus of claim 1, wherein the agricultural implement includes a complementary profile to the implement socket.

11. An implement operating apparatus comprising:
an agricultural implement configured to conduct an agricultural operation, the agricultural implement includes: at least one structural member;
a frame configured for driving and operating the agricultural implement, the frame includes:
an implement socket having a base member and opposed frame members extending from the base member; and
wherein the implement socket is configured to receive the agricultural implement between the opposed frame members in an operating position;
wherein the at least one structural member is coupled between the opposed frame members and supports the opposed frame members in the operating position; and
a latch mechanism, the latch mechanism includes:
a projection recess associated with one of the agricultural implement or the frame;
a projection associated with the other of the frame or the agricultural implement; and
wherein the latch mechanism is configured to guide coupling of the agricultural implement with the implement socket as the frame transitions from the empty position to the operating position.

12. The implement operating apparatus of claim 11, wherein the at least one structural member is configured to constrain movement of the opposed frame members in the operating position.

13. The implement operating apparatus of claim 11, wherein the implement socket includes an open end; and
in the operating position the at least one structural member of the agricultural implement is coupled across the opposed frame members proximate the open end.

14. The implement operating apparatus of claim 11, wherein in the operating position the agricultural implement is coupled across the opposed frame members remotely relative to the base member.

15. The implement operating apparatus of claim 11 comprising a beam attachment mechanism coupled with the opposed frame members, and the beam attachment mechanism is configured to couple the opposed frame members with the agricultural implement.

16. The implement operating apparatus of claim 11, wherein the frame encloses a portion of the agricultural implement in the operating position.

17. The implement operating apparatus of claim 11, wherein the opposed frame members include mounting beams.

18. The implement operating apparatus of claim 11, wherein the frame is configured to transition between an empty position and the operating position:
in the empty position the implement socket is empty; and
in the operating position the implement socket is positioned around the agricultural implement within the implement socket, and the opposed frame members extend along the agricultural implement.

19. A method for using an implement operating apparatus comprising:
guiding a frame having an implement socket toward an agricultural implement, wherein the implement socket is empty and configured for reception of the agricultural implement therein;
positioning the implement socket around the agricultural implement with the agricultural implement between opposed frame members of the frame; and
coupling the agricultural implement to the implement socket of the drive frame, coupling includes:
engaging the frame with the agricultural implement;
guiding coupling of the agricultural implement to the implement socket with a latch mechanism, guiding includes receiving a projection associated with one of the frame or the agricultural implement within a projection recess associated with the other of the agricultural implement or the frame;
coupling at least one structural member of the agricultural implement between the opposed frame members; and
supporting the opposed frame members with the at least one structural member.

20. The method of claim 19, wherein supporting the opposed frame members with the at least one structural member includes constraining movement of the opposed frame members.

21. The method of claim 20, wherein constraining movement of the opposed frame members includes constraining movement of the opposed frame members relative t each other.

22. The method of claim 19, wherein coupling the at least one structural member between the opposed frame members includes coupling the at least one structural member between the opposed frame members proximate an open end of the implement socket.

23. The method of claim 19, wherein the frame includes a base member, and the opposed frame members extending from the base member; and
   coupling the at least one structural member between the opposed frame members includes coupling the at least one structural member between the opposed frame members remote relative to the base member.

24. The method of claim 19, wherein the frame includes a beam attachment mechanism coupled with the opposed frame members; and
   coupling the agricultural implement to the implement socket includes coupling the beam attachment mechanism with the agricultural implement.

25. The method of claim 24, wherein the frame includes a beam attachment mechanism coupled with the opposed frame members; and
   coupling the agricultural implement to the implement socket includes coupling the beam attachment mechanism with the at least one structural member of the agricultural implement.

26. The method of claim 19, wherein positioning the implement socket around the agricultural implement includes enclosing a portion of the agricultural implement between the opposed frame members.

\* \* \* \* \*